S. THOMAS.
Horse-Power.

No. 201,207. Patented March 12, 1878.

WITNESSES:
C. Neveux
C. Sedgwick

INVENTOR:
S. Thomas
BY Munn &c
ATTORNEYS.

UNITED STATES PATENT OFFICE.

SQUIRE THOMAS, OF JUNCTION CITY, OREGON.

IMPROVEMENT IN HORSE-POWERS.

Specification forming part of Letters Patent No. 201,207, dated March 12, 1878; application filed January 17, 1878.

*To all whom it may concern:*

Figure 1:
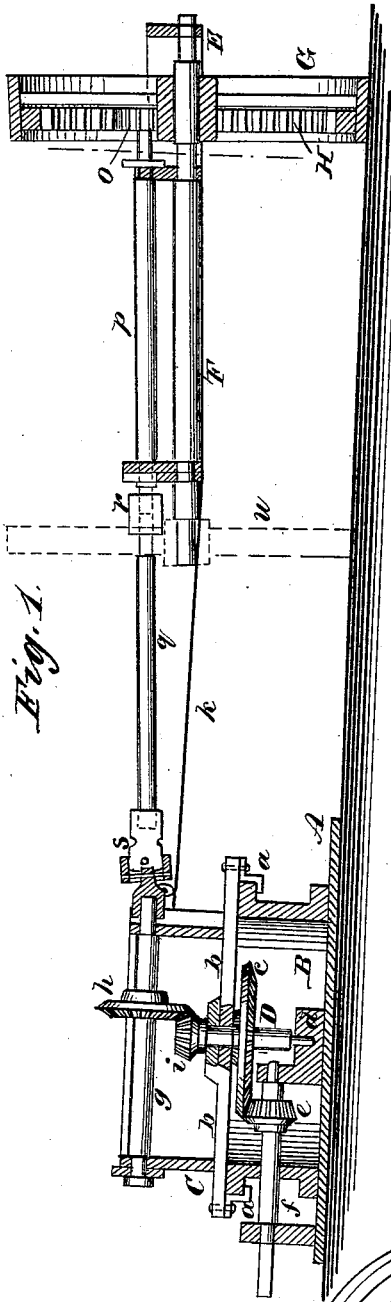
Figure 2:
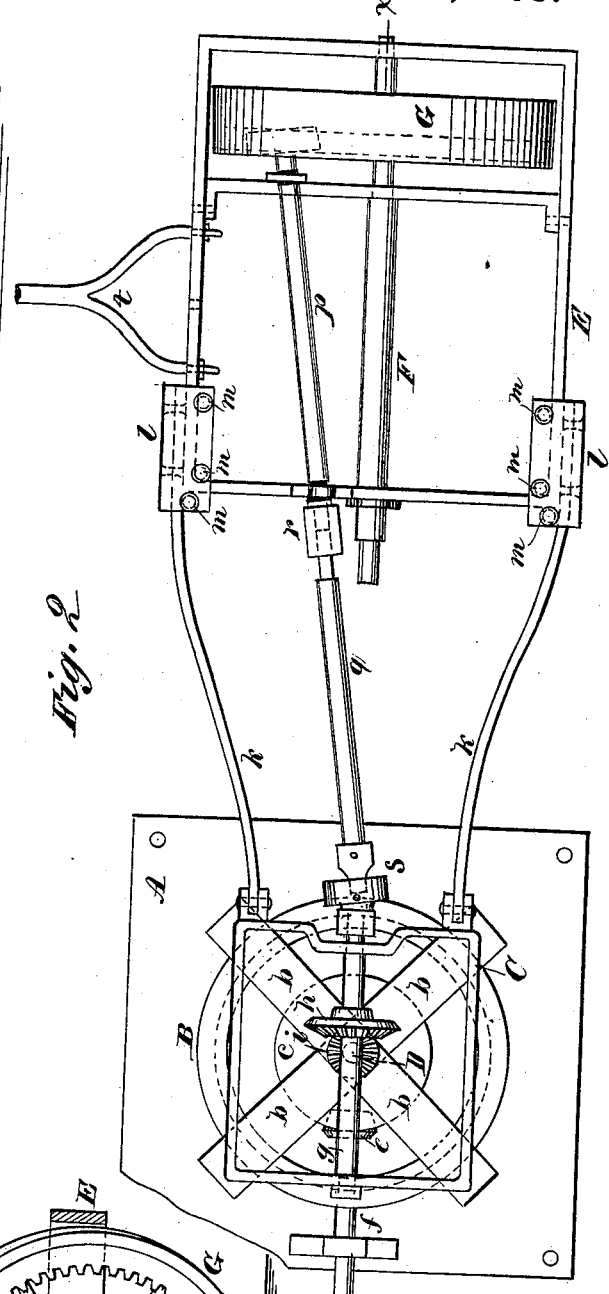
Figure 3:
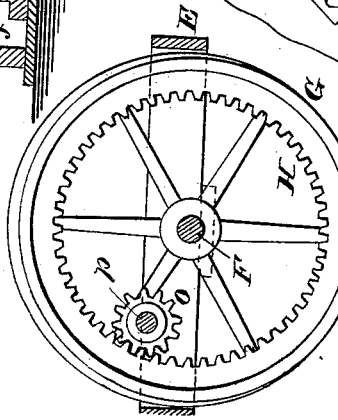

Be it known that I, SQUIRE THOMAS, of Junction City, in the county of Lane and State of Oregon, have invented a new and Improved Horse-Power, of which the following is a specification:

Figure 1 is a longitudinal section taken on line $x\ x$ in Fig. 2. Fig. 2 is a plan view. Fig. 3 is an end elevation.

Similar letters of reference indicate corresponding parts.

My invention consists in a wheel placed in a movable frame, and arranged to roll upon the ground, and in a stationary frame containing gearing that is driven by the traveling wheel.

Referring to the drawings, A is the bed of the machine, to which is secured an annular support, B, for the frame C. The support B is flanged, and clips $a$, one of which is attached to each of the four arms $b$ of the frame C, engage the flange of the support and retain the frame in its position on the support B.

A shaft, D, is journaled in the frame C at the intersection of the arms $b$, and also in a step, $d$, which is secured to the bed A. A bevel-wheel, $c$, is placed on the shaft D, below the arms $b$, and engages a bevel-pinion, $e$, on the horizontal shaft $f$. A shaft, $g$, is journaled in the rectangular portion of the frame C, and carries a bevel-wheel, $h$, which meshes with a pinion, $i$, keyed to the upper end of the shaft D.

To one side of the frame C the arms $k$ are jointed. These arms are attached to opposite sides of the frame E by clips $l$, that are attached to the arms $k$, and extend over the sides of the frame E, and are retained by the pins $m$ that pass through the clips inside of the side pieces of the frame E, and the pins $m$ that pass through the clips outside of the frame E.

In the frame E is journaled a shaft, F, upon which is placed a wheel, G, which has a wide tread, and carries an internally-toothed rim, H, which engages a pinion, $o$, on the shaft $p$. This shaft is journaled in the frame E, and is connected with the shaft $g$ by a rod, $q$, the said rod being coupled with the shaft $p$ by a square sleeve or socket, $r$, which receives the end of the shaft $p$ and rod $q$, both being squared to fit the sleeve.

The rod $q$ is coupled with the shaft $g$ by the universal joint $s$, which is in line with the joints of the arms $k$, so that as the wheel G is drawn forward it may follow the inequalities of the ground without cramping the frame C.

A tongue, $t$, is attached to one side of the frame E, for guiding the horses when the power is in operation, and for guiding the frame E when the power is moved from place to place.

The inner end of the shaft F projects beyond the end of the frame E, for receiving the auxiliary wheel $u$ when the power is to be moved.

The frame E is drawn forward by horses hitched to the tongue, and the wheel G is rotated by contact with the ground. This motion is imparted to the shaft D through the shaft $p$, rod $q$, shaft $g$, wheel $h$, and pinion $i$, and from the shaft D motion is given to the shaft $f$ by the wheel $c$ on the shaft D and the pinion $e$ on the shaft $f$. Power is taken from the shaft $f$ by a tumbling-rod, or in any other convenient manner. The bed A is prevented from turning by stakes driven into the ground through holes in the bed.

When it is desired to move the power, the frame E is disconnected from the arms $k$ by withdrawing the pins $m$, and the wheel $u$ is placed on the end of the shaft F, when the bed A and parts attached to it are suspended from the frame E by slings, or loaded upon the frame. The rod $q$ and arms $k$ are removed and packed upon the frame E. The whole may be easily drawn from one place to another, and it may be readily dismounted and put into condition for use.

Having thus described my invention, I claim as new and desire to secure by Letters Patent—

1. The combination of the ground-wheel G, the frame E, the rotating frame C, and a train of gearing actuated by the ground-wheel G, substantially as herein shown and described.

2. The combination of the arms $k$ with the frames C E, said arms being pivoted or jointed to the frame C and detachably secured to the frame E, as and for the purpose specified.

3. The combination of the auxiliary wheel $u$ with the shaft F, for supporting the frame E, substantially as herein shown and described.

4. The combination, in a horse-power, of the movable frame C, having clips $a$, and the annular support B, secured to the bed A, for confining the moving parts of the power to a common center, as herein shown and described.

SQUIRE THOMAS.

Witnesses:
CORNELIUS NUTT HILL,
FRANCIS MARION WILSON.